United States Patent Office 2,953,588
Patented Sept. 20, 1960

2,953,588

ORGANO-METALLIC COMPOUNDS AND METHOD FOR THEIR PREPARATION

Jerome C. Westfahl, Cuyahoga Falls, Ohio, assignor to The B. F. Goodrich Company, New York, N.Y., a corporation of New York No Drawing. Filed Mar. 8, 1956, Ser. No. 570,389

15 Claims. (Cl. 260—431)

This invention relates to organo-metallic compounds and to their methods of preparation and more particularly pertains to mercury and to copper derivatives of compounds having the metal attached to a carbon atom which has 2 cyano groups attached thereto, and to methods for their preparation by reacting a water-soluble salt of mercury or copper with a 1,1-dicyano compound under alkaline conditions. The organic dicyano compounds which are reacted with the metal salts have the generic formula R—CH$_2$CH(CN)$_2$ in which R represents a hydrocarbon radical, an ester substitued hydrocarbon radical and a nitro substituted hydrocarbon radical.

The compounds of this invention are useful as fungicides in that both the copper and mercury derivatives inhibit the germination of *Alternaria oleracea* spores at a concentration of 100 parts per million. The mercury compounds, in addition, are good bactericidal or bacteriostatic agents, since they inhibit the growth of *S. aureus* on agar plates at the above concentration. The copper salts, however, do not have very good bacteriostatic or bactericidal activity. The mercury compounds in addition can be used to prepare metallic mercury as will be disclosed hereinafter.

In preparing the organo-metallic compounds a 1,1-dicyano compound having the generic structure

R—CH$_2$CH(CN)$_2$ is dissolved in an organic solvent, preferably one which is miscible with water. An organic solvent solution of the metal salt is added to the solution of the 1,1-dicyano compound. It is preferred that the mixture be in solution at this stage. An alkali preferably dissolved in water is then added to make the mixture alkaline in reaction and the organometallic salt precipitates almost immediately. This procedure applied to both copper and mercury salts.

It is not essential that the reaction be carried out in solution. However, it is preferable for the reason that it is readily possible to judge completion of the reaction when precipitation ceases.

Typical compounds having the generic formula

R—CH$_2$CH(CN)$_2$ which can be reacted with water-soluble mercury and copper salts include 1,1-dicyano-2-phenylethane, 1,1-dicyano-2-tolylethane, 1,1-dicyano-2-xylylethane, 1,1-dicyano-2-naphthylethane, 1,1-dicyano-2(2-thenyl) ethane, 1,1-dicyano-2(2,4,6-trimethyl phenyl) ethane, 1,1-dicyano-2-(methoxy phenyl) ethane, 1,1-dicyano(2,5-dimethoxy phenyl) ethane, 1,1-dicyano-2(2-methoxy-5-chloro phenyl) ethane, 1,1-dicyano-2(2-furano) ethane, and 1,1-dicyano-2(2-ethyl-5-cyanomethyl phenyl) ethane. All of these compounds can be prepared by reacting the appropriate cyclic compound with 1,1-dicyano ethylene in an inert diluent in the presence of aluminum chloride as a catalyst, whereby 1,1-dicyano ethane replaces a hydrogen on a ring carbon atom.

Additional compounds which can be reacted with mercuric and cupric salts include malonic esters and aliphatic nitro compounds having one active hydrogen replaced with a 1,1-dicyano ethane group. Members of this group are malonic esters having the generic structure

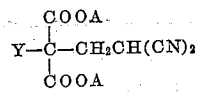

in which A is an alkyl group of a monohydric alkanol, preferably a lower alkyl group having from 1 to about 6 carbon atoms, and Y is a lower alkyl group as defined above, or a phenyl substituted lower alkyl group. Exemplary compounds include dimethyl ethyl(2,2-dicyanoethyl) malonate, diethyl ethyl(2,2-dicyanoethyl) malonate, dipropyl methyl(2,2-dicyanoethyl) malonate, dibutyl propyl(2,2-dicyanoethyl) malonate, dihexyl hexyl(2,2-dicyanoethyl) malonate, dimethyl phenyl(2,2-dicyanoethyl) malonate, diethyl tolyl(2,2-dicyanoethyl) malonate and other malonic esters of this same general type.

The aliphatic nitro compounds that can be employed can be graphically written as

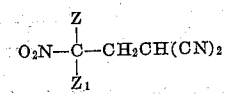

in which Z and Z$_1$ each represents an alkyl group having from 1 to about 6 carbon atoms. Exemplary compounds include 1,1-dicyano-3-methyl-3-nitrobutane, 1,1-dicyano-3-methyl-3-nitropentane, 1,1-dicyano-3-methyl-3-nitrohexane, 1,1-dicyano-3-methyl-3-nitroheptane, 1,1-dicyano-3-methyl-3-nitrooctane, 1,1-dicyano-3-methyl-3-nitrononane, 1,1-dicyano-3-ethyl-3-nitropentane, 1,1-dicyano-3-ethyl-3-nitrohexane, 1,1-dicyano-3-propyl-3-nitrohexane, 1,1-dicyano-3-propyl-3-nitroheptane, 1,1-dicyano-3-ethyl-3-nitroheptane, 1,1-dicyano-3-pentyl-3-nitrononane and 1,1-dicyano-3-hexyl-3-nitrononane.

The malonic ester and nitro paraffin derivatives containing a 1,1-dicyano ethane group can be prepared by reacting a homopolymer of 1,1-dicyano ethylene with the appropriate malonic ester or nitro paraffin having one active hydrogen in the presence of an alkali metal alkoxide in a water-free medium.

Thus, the R group of the generic formula

R—CH$_2$CH(CN)$_2$ represents a mono- or bicyclic aromatic group, lower alkyl and lower alkoxy substituted derivatives thereof, monohalo lower alkoxy poly-substituted aromatic group, a cyano lower alkyl substituted aromatic group, a thenyl group, a furan group, a nitro paraffin group in which the nitro group and the —CH$_2$CH(CN)$_2$ groups are attached to the same carbon atom of the paraffin chain, and a mono- lower alkyl or phenyl substituted lower alkyl substituted malonic acid ester of a lower alkanol. The mercury salts which can be employed include mercuric chloride, mercuric bromide, mercuric iodide, mercuric sulfate, mercuric nitrate, mercuric phosphate, mercuric formate, mercuric acetate, mercuric citrate and other water-soluble or organic solvent soluble mercuric salts. The copper salts can be cupric nitrate, cupric sulfate, cupric chloride, cupric acetate, cupric bromide, cupric carbonate, cupric formate, cupric fluosilicate, cupric salicylate, cupric propionate, cupric butyrate and other water-soluble or organic solvent soluble cupric salts.

The alkaline material can be a water-soluble alkali metal hydroxide, oxide, carbonate or bicarbonate or sparingly soluble alkaline earth metal hydroxides, carbonates and bicarbonates which will give an alkaline reaction in water.

The reaction proceeds very rapidly at room temperature. It is therefore preferred that such temperature be employed, although elevated temperatures and temperatures lower than room temperatures are also useful since it appears that the reaction is ionic in nature.

The following examples are intended to illustrate the invention but are not to be considered as limitations thereon. In these examples the parts are by weight unless otherwise specified.

*Example I*

6.7 grams of a compound having the structure

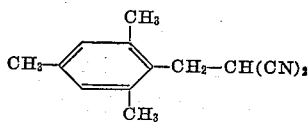

were dissolved in an excess (200 ml.) of ethyl alcohol. 4.5 grams of mercuric chloride dissolved in 100 parts by volume of ethanol were added to the solution described above. Thereafter a solution containing 1.4 grams of sodium hydroxide in 70 ml. of water was added dropwise to the mixture of mercuric chloride and 1,1-dicyano-2(2,4,6-trimethyl phenyl) ethane. The organo-metallic compound having the structure

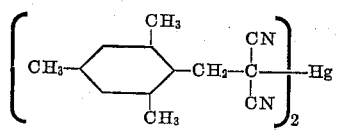

precipitated immediately. A 92% yield based on the organic reactant was recovered.

The organo-metallic mercury compound of this example was soluble in dimethyl formamide from which it was recrystallized by the addition of water. The crystals decomposed without melting at a temperature of 225–228° C. and liberated metallic mercury upon decomposition.

An analysis on this compound yielded the following results:

|   | Calculated | Found |
|---|---|---|
| C | 52.47 | 52.44 |
| H | 4.40 | 4.34 |
| N | 9.42 | 9.40 |
| Hg | 33.71 | 33.64 |

*Example II*

4.14 grams of

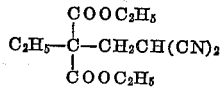

were dissolved in 50 ml. of ethanol. To this solution was added a solution of 2.11 grams of mercuric chloride in 50 ml. of ethanol. A solution containing .62 gram of sodium hydroxide in 31 ml. of water was prepared. The sodium hydroxide solution was added dropwise to the mercuric chloride

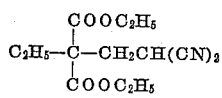

solution in ethanol. A colorless solid precipitated quite rapidly during the addition of the alkali. A yield of 4.96 grams of mercury salt having the formula

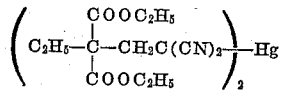

was recovered. This represents a yield of 87.3%.

The crystals were dissolved in benzene and precipitated with hot hexane. The recrystallized, colorless, product apparently exists in polymorphic forms. One form of the crystals had a melting point of 109 to 110° C. and the other form has a melting point of 133 to 134° C., each with decomposition. The only observable difference was that in packing, which was shown by X-ray diffraction patterns. An analysis of the product gave the following results:

|   | Calculated | Found |
|---|---|---|
| C | 42.71 | 42.66 |
| H | 4.69 | 4.52 |
| N | 7.66 | 7.63–7.71 |
| Hg | 27.44 | 27.60 |
| O | 17.51 | [1] 17.56 |

[1] By difference.

*Example III*

A solution containing 3.46 grams of 1,1-dicyano-3-methyl-3-nitrobutane in 100 ml. of ethanol was prepared. Another solution containing 2.81 grams of mercuric chloride in 50 ml. of ethanol was also prepared and the alcohol solutions were mixed together. A solution containing .83 gram of sodium hydroxide in 42 ml. of water was prepared and added dropwise to the alcoholic solution of 1,1-dicyano-3-methyl-3-nitrobutane and mercuric chloride. The mercury salt having the formula

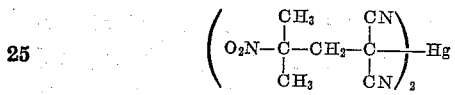

was recovered in a 96% yield. The crude product had a melting point of 168 to 170, with decomposition. When recrystallized from an acetone-water mixture, the melting point of the purified material was 178° C., with decomposition. On analysis this compound was found to contain the following elemental composition:

|   | Calculated | Found |
|---|---|---|
| C | 31.55 | 31.61 |
| H | 3.03 | 2.98 |
| N | 15.77 | 15.59 |
| Hg | 37.64 | 37.59 |
| O | 12.01 | [1] 12.23 |

[1] By difference.

*Example IV*

6.5 grams of

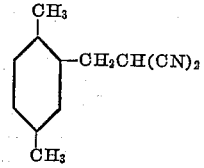

were dissolved in 50 ml. of ethanol. To this solution was added a solution of 4.78 grams of mercuric chloride in 20 ml. of ethanol. A solution of 1.41 grams of sodium hydroxide in 15 ml. of water was prepared and added dropwise to the alcoholic solution containing the mercuric chloride and the 1,1-dicyano compound. A 93.8% yield of colorless crystals was obtained. Crystals were soluble in dimethyl formamide and were recrystallized by addition of water to the dimethyl formamide solution. The recrystallization material had a melting point of 223.5 to 224.5° C., with decomposition. The structure of this derivative is

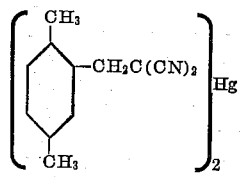

Metallic mercury formed on decomposition of the crystals with heat.

*Example V*

A solution of 8.73 grams of 1,1-dicyano-2(2,5-dimethyl phenyl) ethane in 70 ml. of ethanol was mixed with a solution of 3.18 grams of cupric chloride in 25 ml. of ethanol. A solution of 1.9 grams of sodium hydroxide in 15 ml. of water was prepared and added dropwise to the alcoholic solution of cupric chloride and

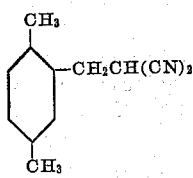

A yield of 74.4% of green crystals was obtained. No solvent was found for these crystals. They were filtered and washed with water, then with dilute acetic acid and again with water until no acetate was found in the filtrate. The compound decomposed without melting. It has the formula

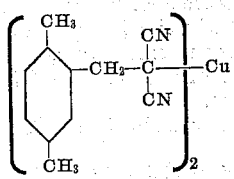

By using the same molar proportions and procedure as disclosed in Example I the following additional compounds are formed.

VI 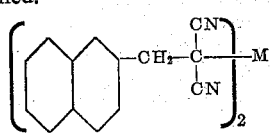

VII 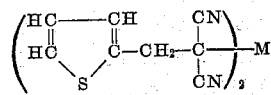

VIII 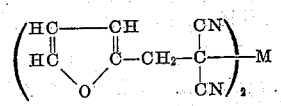

IX 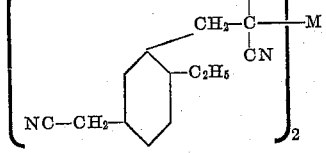

X 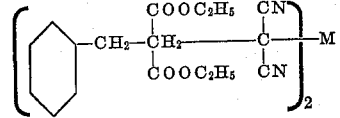

M in the above formulas represents mercury and copper.

Although sodium hydroxide has been described as the alkaline ingredient in preparation of the mercury and copper salts other metallic alkaline materials which will increase the pH of the mixture in aqueous systems are also effective. Ammonia, however, is not desirable because it forms complexes with copper and mercury ions so that they are not reactive.

Diluents, other than ethanol, in which these compounds are soluble can also be employed. Thus, methanol, the propanols, butanols and amyl alcohols can be used. In addition, inert ketones such as acetone, methylethyl ketone and higher ketones which are miscible with water can also be employed. Diethyl ether and other liquid ethers are also useful as diluents. The presence of water is desirable because of its high dielectric constant in which ions, when formed, can react. The preferred diluents are water miscible.

The other 1,1-dicyano compounds mentioned herein-above can be substituted for those described in the specific examples to provide corresponding mercury or copper derivatives.

The organo mercury compounds have the unique property of being quite stable on standing at room temperature and in being non-deliquescent.

The mercury and copper compounds all conform to the generic formula

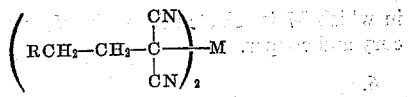

in which M is copper or mercury and R has the designation given above.

Although I have illustrated this invention by reference to specific examples it will be apparent to those skilled in the art that many variations in the reactants, their proportions and their reaction conditions are possible. Accordingly, the examples are not intended to be limitations on the invention but are intended for illustrative purposes only.

I claim:

1. A compound of the structure

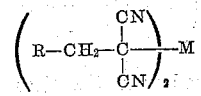

wherein M is selected from the class consisting of mercury and copper and R is selected from the class consisting of (1) monocyclic aromatic hydrocarbon groups, bicyclic aromatic hydrocarbon groups, and ring substituted derivatives of said monocyclic and bicyclic hydrocarbon groups wherein the substituents are lower alkyl, lower alkoxy, cyano lower alkyl, and both halogen and lower alkoxy groups (2) malonic diester groups having the structure

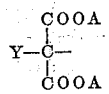

in which A represents a lower alkyl group and Y represents a lower alkyl group and a monophenyl substituted derivative thereof and (3) nitroparaffin groups of from 3 to 13 carbon atoms in which the nitro group and the

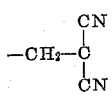

group are both attached to the same carbon atom of the paraffin chain.

2.

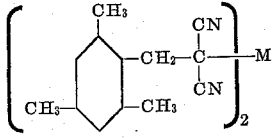

in which M is selected from the class consisting of mercury and copper.

3.

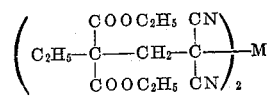

in which M is selected from the class consisting of mercury and copper.

4.

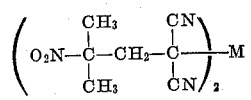

in which M is selected from the class consisting of mercury and copper.

5. 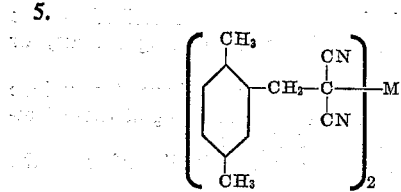

in which M is selected from the class consisting of mercury and copper.

6. 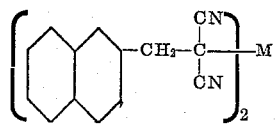

in which M is selected from the class consisting of mercury and copper.

7. A method for preparing compounds having the structure

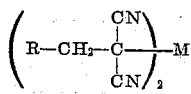

wherein M is selected from the class consisting of mercury and copper and R is selected from the class consisting of (1) monocyclic aromatic hydrocarbon groups and bicyclic aromatic hydrocarbon groups and ring substituted derivatives of said monocyclic and bicyclic hydrocarbon groups wherein the substituents are lower alkyl, lower alkoxy, cyano lower alkyl and both halogen and lower alkoxy groups, (2) malonic diester groups having the structure

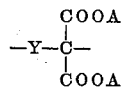

in which A represents a lower alkyl group and Y represents a lower alkyl group and a monophenyl substituted derivative thereof and (3) nitroparaffin groups of from 3 to 13 carbon atoms in which the nitro group and the

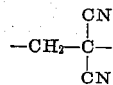

are both attached to the same carbon atom in the paraffin chain, comprising reacting under alkaline conditions in an inert diluent a compound of the formula

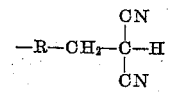

wherein R has the same designation as above with a salt of a metal selected from the class consisting of mercury and copper, said salt being soluble in the reaction medium.

8. The method of claim 7 in which the reaction is carried out in the presence of water and an inert diluent.

9. The method of claim 7 in which the reaction is carried out at about room temperature.

10. The method of claim 7 in which the mercury salt is mercuric chloride.

11. The method of claim 7 in which the copper salt is cupric chloride.

12. The method of claim 7 in which an aqueous solution of an alkali metal hydroxide is used to effect the alkaline reaction conditions.

13. The method of claim 12 in which the alkali metal hydroxide is NaOH.

14. The method of claim 7 in which the diluent is a water-miscible alkanol.

15. The method of claim 14 in which the alkanol is ethanol.

References Cited in the file of this patent

UNITED STATES PATENTS

| | | |
|---|---|---|
| 2,762,811 | Middleton et al. | Sept. 11, 1956 |
| 2,766,246 | Middleton et al. | Oct. 9, 1956 |

OTHER REFERENCES

Naik et al: J. Indian Chem. Soc. 9, 533 (1933).
Naik et al: J. Indian Chem. Soc. 9, 185 (1933).